(12) United States Patent
Wang

(10) Patent No.: US 7,028,023 B2
(45) Date of Patent: Apr. 11, 2006

(54) LINKED LIST

(75) Inventor: Ming-Jen Wang, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 632 days.

(21) Appl. No.: 10/260,471

(22) Filed: Sep. 26, 2002

(65) Prior Publication Data

US 2004/0064448 A1  Apr. 1, 2004

(51) Int. Cl.
*G06F 17/30* (2006.01)

(52) U.S. Cl. .......................... 707/2; 707/100

(58) Field of Classification Search .............. 707/2, 707/3, 6, 7, 104.1, 100
See application file for complete search history.

(56) References Cited

U.S. PATENT DOCUMENTS

| | | | | |
|---|---|---|---|---|
| 5,263,160 A | * | 11/1993 | Porter et al. | 707/3 |
| 5,446,889 A | * | 8/1995 | Prestifilippo et al. | 707/100 |
| 5,644,784 A | * | 7/1997 | Peek | 710/24 |
| 5,671,406 A | * | 9/1997 | Lubbers et al. | 707/7 |
| 5,893,162 A | * | 4/1999 | Lau et al. | 711/153 |
| 5,905,990 A | * | 5/1999 | Inglett | 707/200 |
| 5,950,191 A | * | 9/1999 | Schwartz | 707/3 |
| 6,301,646 B1 | * | 10/2001 | Hostetter | 711/206 |
| 6,321,219 B1 | * | 11/2001 | Gainer et al. | 707/3 |
| 6,499,083 B1 | * | 12/2002 | Hamlin | 711/112 |
| 6,581,063 B1 | * | 6/2003 | Kirkman | 707/100 |
| 6,687,699 B1 | * | 2/2004 | Courey, Jr. | 707/10 |
| 6,760,726 B1 | * | 7/2004 | Hersh | 707/8 |

* cited by examiner

*Primary Examiner*—John Breene
*Assistant Examiner*—Cheryl Lewis
(74) *Attorney, Agent, or Firm*—Cochran Freund & Young LLP

(57) ABSTRACT

A computerized list is provided with auxiliary pointers for traversing the list in different sequences. One or more auxiliary pointers enable a fast, sequential traversal of the list with a minimum of computational time. Such lists may be used in any application where lists may be reordered for various purposes.

4 Claims, 2 Drawing Sheets

LINKED LIST

BACKGROUND OF THE INVENTION a. Field of the Invention

The present invention pertains to computerized lists and specifically to traversing computerized lists in different orders.

b. Description of the Background

Lists of various sorts are commonplace within computer systems. For example, in input-output operations, requests for information, and the responses for the information may come in the form of lists. The lists may be in sequential order as determined by the sequence that various sectors of a disk were read. The list of information off of the disk may not be in the proper order for the intended request. In such a case, the list would need to be resorted to match the intended recipient.

The conventional method of searching a list is sequential. This involves traversing the list to locate a specific item in the list. When a second item or record is needed, the searching may resume from the top of the list. The conventional method is time consuming and may require many computational cycles to find the necessary items in the proper sequence.

Lists may be sorted so that the items may be accessed sequentially. Once the list is sorted into a particular sequence, the individual items may be accessed in order very quickly. However, there is substantial overhead in the reordering of the items into the desired order. In some cases, there is a need for the list to be presented in more than one order. In such a case, the list may have to be resorted, using more computational cycles.

It would therefore be advantageous to provide a system and method for quickly traversing a sequential list in a second sequence. It would be further advantageous if the list could be quickly traversed in different sequences without resorting the list each time.

SUMMARY OF THE INVENTION

The present invention overcomes the disadvantages and limitations of the prior art by providing a system and method for traversing a list using auxiliary pointers that indicate the next item in a sequence. The sequential list may be created in one sequence, but used in a second sequence without having to resort the list.

The present invention may therefore comprise a computerized list that may be traversed in at least two sequences comprising: a first sequence of items that comprise the list; and a primary pointer and an auxiliary pointer for each of the items of the list, the primary pointer being adapted to direct a computer program to a first following item and defining a first sequence to traverse the list, the auxiliary pointer being adapted to direct the computer program to a second following item and defining a second sequence to traverse the list.

The present invention may further comprise a method of traversing a list having at least two sequential pointers comprising: providing the list to be traversed, the list comprising a plurality of items; for each of the items of the list, providing at least a primary pointer and a secondary pointer, the primary pointer being adapted to point to a first sequential item and defining a first sequence to traverse the list, the secondary pointer being adapted to point to a second sequential item and defining a second sequence to traverse the list; determining to use the second sequence to traverse the list; determining a starting item for traversing the list, the item being the current item; performing an operation on the current item; traversing the list to a new item indicated by the secondary pointer, the new item replacing the current item as the current item; and repeating the previous two steps at least one time to traverse the list.

The present invention may further comprise a computer system capable of traversing a list having at least two sequential pointers comprising: the list to be traversed, the list comprising a plurality of items; at least a primary pointer and a secondary pointer for each of the items of the list, the primary pointer being adapted to point to a first sequential item and defining a first sequence to traverse the list, the secondary pointer being adapted to point to a second sequential item and defining a second sequence to traverse the list; the ability to determine to use the second sequence to traverse the list; the ability to determine a starting item for traversing the list, the item being the current item; the ability to perform an operation on the current item; the ability to traverse the list to a new item indicated by the secondary pointer, the new item replacing the current item as the current item; and the ability to repeat the previous two steps at least one time to traverse the list.

The advantages of the present invention are that a list may be traversed in different sequences without resorting or sequentially traversing the list.

DETAILED DESCRIPTION OF THE INVENTION

Figure 1:
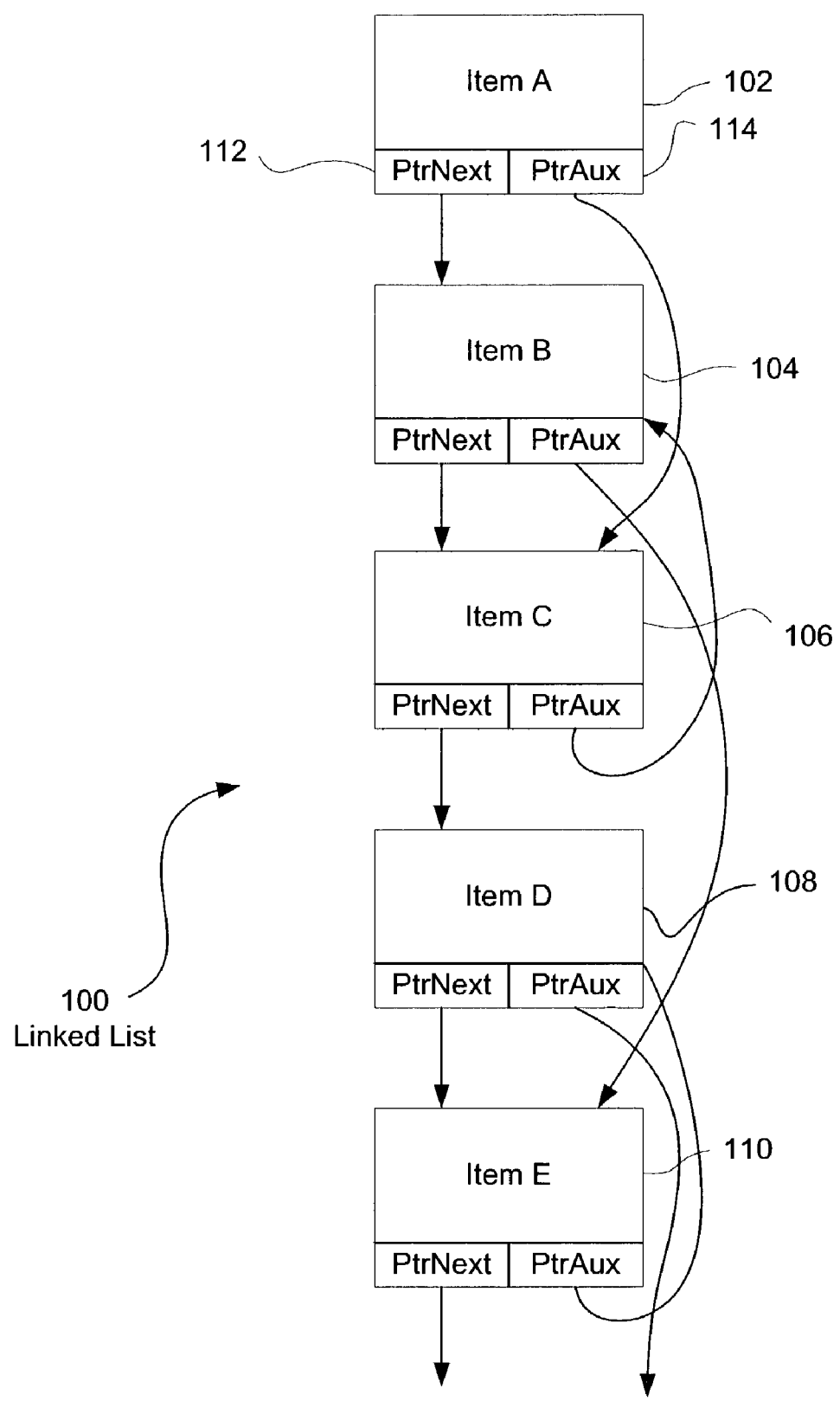
FIG. 1 is an illustration of a first embodiment of the present embodiment a linked list.

FIG. 1 illustrates an embodiment 100 of the present embodiment a linked list. The list 100 is comprised of item A 102, item B 104, item C 106, item D 108, and item E 110. Each item has a Next Pointer 112 and an Auxiliary Pointer 114.

The next pointer 112 indicates the next item in the first sequence. In the present example, the items are in the sequence A B C D E.

The auxiliary pointer 114 indicates the next item in a second sequence that may or may not be the same sequence as the first sequence. In the present example, the items are in the sequence A C B E D.

By using either pointer, the list 100 may be traversed in either order with a minimum of searching for the next item in the sequence. For example, if the list 100 were generated by a disk drive in a response to a read request, the items may have been read from the disk in the series A B C D E. However, the items may be needed by the host computer in the series A C B E D. As the items are loaded into the list, an auxiliary pointer is kept for each item directing the disk system to the next item in the sequence. When the items are sent to the requestor, the auxiliary pointer may be used to access the items in the proper sequence.

Figure 2:
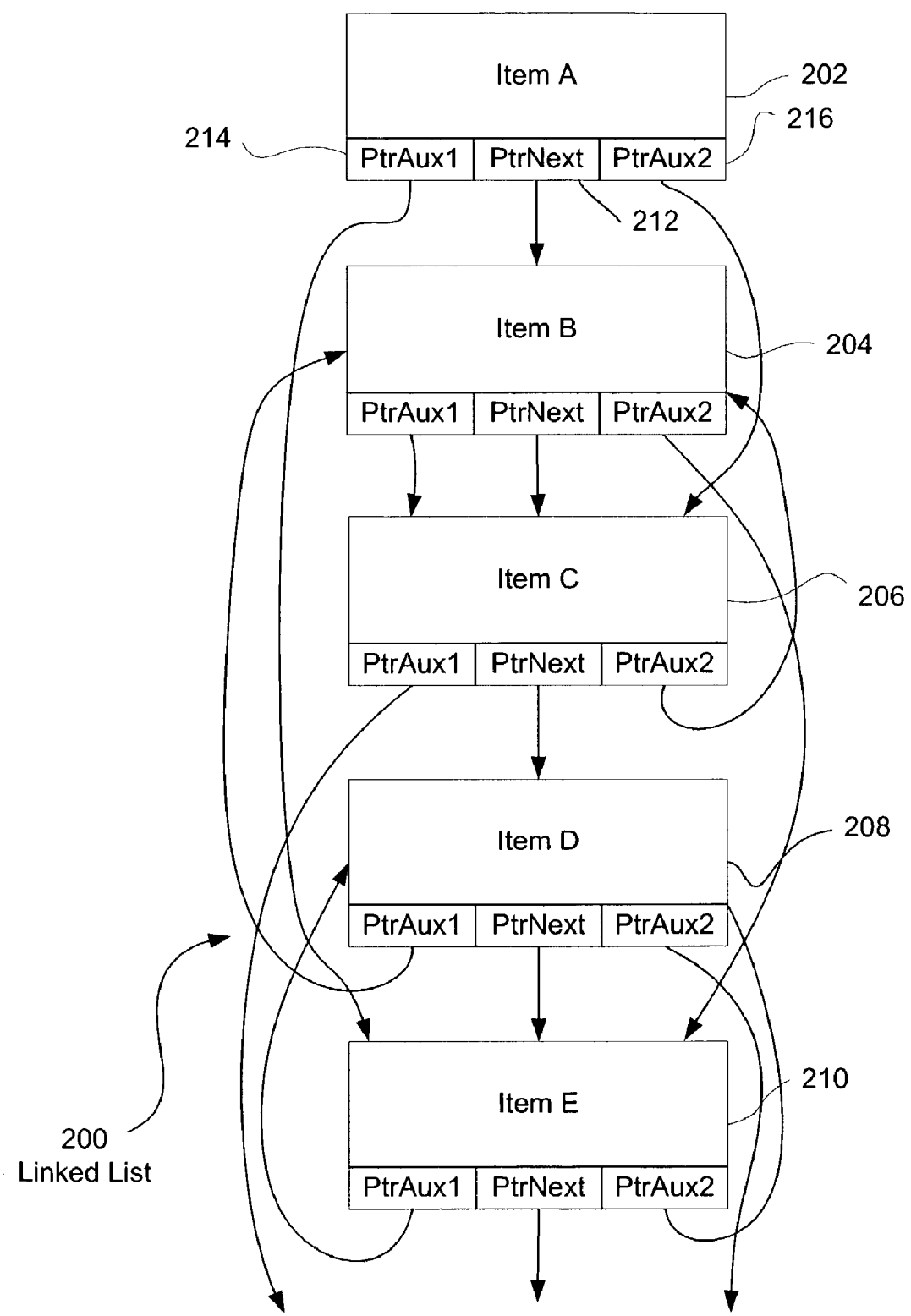
FIG. 2 is an illustration of a second embodiment of the present invention of a linked list.

FIG. 2 illustrates an embodiment 200 of the present invention of a linked list. The list 200 is comprise of item A 202, item B 204, item C 206, item D 208, and item E 210. Each item has a next pointer 212, a first auxiliary pointer 214, and a second auxiliary pointer 216.

The next pointers 212 may be used to access the list 200 in the order A B C D E. When the first auxiliary pointers 214 are used, the order of the items is A E D B C. When the second auxiliary pointers 216 are used, the order is A C B E D. Those skilled in the arts will appreciate that multiple pointers may be used to create several predefined sequences for a particular list.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computerized list that may be traversed in at least two sequences comprising:
   a plurality of items that are contained in said computerized list; and
   a primary pointer and an auxiliary pointer for each of said items of said computerized list such that each of said items has an associated primary pointer and an associated auxiliary pointer, said primary pointer functioning as a primary linked list to direct a computer program to a first following item and defining a first sequence to traverse said computerized list, said auxiliary pointer functioning as an auxiliary linked list to direct said computer program to a second following item and defining a second sequence to traverse said computerized list.

2. The computerized list of claim 1 further comprising a tertiary pointer for each of said items of said computerized list such that each of said items has an associated tertiary pointer, said tertiary pointer functioning as a tertiary linked list to direct said computer program to a third following item and defining a third sequence to traverse said computerized list.

3. A method of traversing a computerized list having at least two sequential pointers comprising:
   providing said computerized list to be traversed, said computerized list comprising a plurality of items;
   providing at least a primary pointer and a secondary pointer for each of said items of said computerized list such that each of said items has associated primary pointer and an associated auxiliary pointer, said primary pointer functioning as a primary linked list to point to a first sequential item and defining a first sequence to traverse said computerized list, said secondary pointer functioning as an auxiliary linked list to point to a second sequential item and defining a second sequence to traverse said computerized list;
   using said second sequence to traverse said computerized list by designating a starting item to traverse said computerized list from said items of said computerized list and initially setting a current item to said starting item;
   performing a traversal operation, said traversal operation comprising:
      performing an operation on said current item; and
      traversing said computerized list to a new item indicated by said secondary pointer by setting said current item to said new item; and
   repeating said traversal operation until said second sequence is ended.

4. A computer system capable of traversing a list having at least two sequential pointers comprising:
   a plurality of items that are contained in said list to be traversed;
   at least a primary pointer and a secondary pointer for each of said items of said list such that each of said items has an associated primary pointer and an associated secondary pointer, said primary pointer functioning as a primary linked list to point to a first sequential item and defining a first sequence to traverse said list, said secondary pointer functioning as a secondary linked list to point to a second sequential item and defining a second sequence to traverse said list; and
   a computer program that uses said second sequence to traverse said list.

* * * * *